United States Patent
Doddaiah et al.

(10) Patent No.: US 11,880,577 B2
(45) Date of Patent: Jan. 23, 2024

(54) TIME-SERIES DATA DEDUPLICATION (DEDUPE) CACHING

(71) Applicant: Dell Products L.P., Round Rock, TX (US)

(72) Inventors: Ramesh Doddaiah, Westborough, MA (US); Peng Wu, Westborough, MA (US); Jingtong Liu, Natick, MA (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/579,671

(22) Filed: Jan. 20, 2022

(65) Prior Publication Data

US 2023/0229329 A1 Jul. 20, 2023

(51) Int. Cl.
*G06F 3/06* (2006.01)
*G06F 16/14* (2019.01)

(52) U.S. Cl.
CPC .......... *G06F 3/0641* (2013.01); *G06F 3/0608* (2013.01); *G06F 3/0656* (2013.01); *G06F 3/0685* (2013.01); *G06F 16/152* (2019.01)

(58) Field of Classification Search
None
See application file for complete search history.

(56) References Cited

U.S. PATENT DOCUMENTS 10,705,733 B1 * 7/2020 Smaldone ............... G06F 3/067
2017/0038978 A1 * 2/2017 Li ........................... G06F 3/0611

* cited by examiner

*Primary Examiner* — Michael Alsip
(74) *Attorney, Agent, or Firm* — Krishnendu Gupta; Nikhil Patel

(57) ABSTRACT

Aspects of the present disclosure relate to data deduplication (dedup) techniques for storage arrays. In embodiments, a sequence of input/output (IO) operations in an IO stream received from one or more host devices by a storage array are identified. Additionally, a determination is made as to whether previously received IO operations match the identified IO based on an IO rolling offsets empirical distribution model. Further, one or more data deduplication (dedup) techniques are performed on the matching IO sequence based on a comparison of a source compression technique and a target compression technique related to the identified IO sequence.

20 Claims, 5 Drawing Sheets ical and current events related to the data access rates of each data track per time window can be analyzed In embodiments, data can be stored in a cache. For example, the stored data can be related to tracks with a data access rate above a threshold. Further, one or more data deduplication (dedupe) operations for the matching IO sequence can be performed based on the comparison of the source and target compression techniques and the data access rates.

TIME-SERIES DATA DEDUPLICATION (DEDUPE) CACHING

BACKGROUND

A storage array is a data storage system for block-based storage, file-based storage, or object storage. Rather than store data on a server, storage arrays use multiple drives in a collection capable of storing a vast amount of data. Storage arrays can include a central management system that manages the data. In addition, storage arrays can establish data dedupe techniques to maximize the capacity of their storage drives. Data deduplication techniques eliminate redundant data in a data set. The techniques can include identifying copies of the same data and deleting the copies such that only one copy remains.

SUMMARY

Aspects of the present disclosure relate to data deduplication (dedup) techniques for storage arrays. In embodiments, a sequence of input/output (IO) operations in an IO stream received from one or more host devices by a storage array are identified. Additionally, a determination is made as to whether previously received IO operations match the identified IO based on an IO rolling offsets empirical distribution model. Further, one or more data deduplication (dedup) techniques are performed on the matching IO sequence based on a comparison of a source compression technique and a target compression technique related to the identified IO sequence.

In embodiments, an IO sequence's unique fingerprint can be generated in response to a first event identifying the IO sequence. The unique fingerprints can be generated by identifying a data track related to each IO operation of the IO stream. For example, the data track corresponds to one of the storage system's storage devices. Further, a searchable fingerprint data structure configured to map each unique fingerprint to its related data track address can be updated.

In embodiments, a temporal parameter corresponding to each IO operation of the identified IO sequence can be generated. Additionally, a searchable fingerprint data structure can be updated to associate each fingerprint with the temporal parameter of the fingerprint's related IO operations.

In embodiments, a determination can be as to whether the identified IO sequence includes or relates to compressed data.

In embodiments, whether the compression technique related to the IO sequence's data payload matches the target compression technique related to the IO sequence's target data stored by the array can also be determined.

In embodiments, a data compression technique for uncompressed data can be based on the uncompressed data's related data access rates.

A data access rate of one or more data tracks can be determined in embodiments. Additionally, the data access rates of each data track can be compared to a threshold. Further, compressed or uncompressed versions of the data related to the data tracks can be stored based on a result of the comparison in a cache In embodiments, historical and current events related to the data access rates of each data track can be analyzed. Further, based on the analysis, one or more data access rate patterns can be identified.

BRIEF DESCRIPTION OF THE DRAWINGS

The foregoing and other objects, features, and advantages will be apparent from the following more particular description of the embodiments, as illustrated in the accompanying drawings in which like reference characters refer to the same parts throughout the different views. The drawings are not necessarily to scale, emphasis instead being placed upon illustrating the principles of the embodiments.

DETAILED DESCRIPTION

A business like a financial or technology corporation can produce large amounts of data and require sharing access to that data among several employees. As such, these companies often use storage arrays that deliver block-based storage, file-based storage, or object storage. Because a storage array uses multiple storage drives (e.g., hard-disk drives (HDD) and solid-state drives (SSD)), a company can scale (e.g., increase or decrease) and manage storage capacity more efficiently than storage solutions delivered by a server. In addition, a company can use a storage array to read/write data required by one or more business applications.

Storage arrays can establish data dedupe techniques to maximize the capacity of their storage drives. Data deduplication techniques eliminate redundant data in a data set. The techniques can include identifying copies of the same data and deleting the copies such that only one copy remains.

The techniques can generate a hash table including a unique fingerprint for each data track stored by a storage array to identify duplicated data. For example, a storage array can generate a unique fingerprint of an input/output (IO) request's data payload. Further, the array can compare the IO request's related fingerprint to those included in the hash table. In some examples, the array can select a statistically relevant subset of a newly generated fingerprint's bytes and compare those to a corresponding hash table-recorded fingerprint bytes. In other examples, the array can perform byte-to-byte comparisons (i.e., match every fingerprint byte). However, the byte-to-byte comparison requires a significant amount of the array's resources, compounded by an IO request's target data track not being in the array's cache memory.

Embodiments of the present disclosure identify hash table-recorded fingerprints related to "hot" data tracks and cache each track's corresponding data in memory, as described in greater detail herein.

Figure 1:
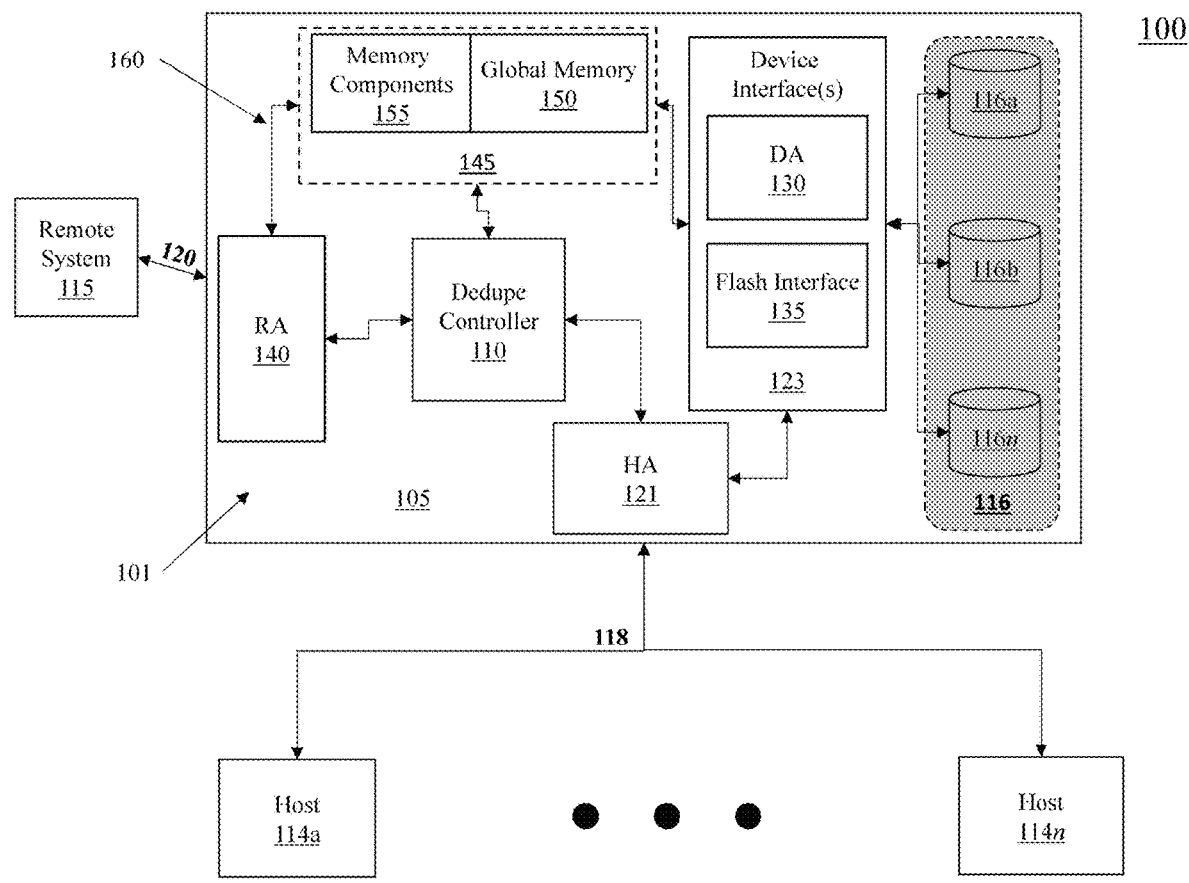
FIG. 1 is a block diagram of a storage system in accordance with example embodiments disclosed herein.

Regarding FIG. 1, a system 100 includes a storage array 105 that includes components 101 configured to perform one or more distributed file storage services. In embodiments, the array 105 can include one or more internal communication channels 160 that communicatively couple each of the array's components 101. The communication channels 160 can include Fibre channels, internal busses, or communication modules. For example, the array's global memory 150 can use the communication channels 160 to transfer data or send other communications between the array's components 101.

In embodiments, the array 105 and one or more devices can form a network. For example, the array 105 and host systems 114a-n can define a first communication network 118. Further, the first network's topology can have the hosts 114a-n and the array 105 physically co-located or remotely located from one another. Likewise, the array 105 and a remote system 115 can define a second communication network 120. Additionally, the array's RA 140 can manage communications between the array 105 and an external storage system (e.g., remote system 115) using the networks 118, 120. The networks 118,120 can be a wide area network (WAN) (e.g., Internet), local area network (LAN), intranet, Storage Area Network (SAN)), Explicit Congestion Notification (ECN) Enabled Ethernet network and the like.

In further embodiments, the array 105 and other networked devices (e.g., the hosts 114a-n and the remote system 115) can send/receive information (e.g., data) using a communications protocol. The communications protocol can include a Remote Direct Memory Access (RDMA), TCP, IP, TCP/IP protocol, SCSI, Fibre Channel, Remote Direct Memory Access (RDMA) over Converged Ethernet (ROCE) protocol, Internet Small Computer Systems Interface (iSCSI) protocol, NVMe-over-fabrics protocol (e.g., NVMe-over-ROCEv2 and NVMe-over-TCP), and the like.

The networked devices 105, 115a-n, 116, and the like can connect to the networks 118,120 via a wired/wireless network connection interface, bus, data link, and the like. Further, the networks 118, 120 can also include communication nodes that enable the networked devices to establish communication sessions. For example, communication nodes can include switching equipment, phone lines, repeaters, multiplexers, satellites, and the like.

In embodiments, the array's components 101 can receive and process input/output (IO) workloads. An IO workload can include one or more IO requests (e.g., read/write requests or other storage service-related operations) originating from the hosts 114a-n or remote system 115. For example, one or more hosts 114a-n can run an application that requires a read/write of data to the array 105.

In embodiments, the array 105 and remote system 115 can include a variety of proprietary or commercially available single or multi-processor systems (e.g., an Intel-based processor and the like). Likewise, the array's components 101 (e.g., HA 121, RA 140, device interface 123, and the like) can include physical/virtual computing resources (e.g., a processor and memory) or require access to the array's resources. For example, the memory can be a local memory 145 configured to store code that the processor can execute to perform one or more storage array operations.

In embodiments, the HA 121 can be a Fibre Channel Adapter (FA) that manages communications and data requests between the array 105 and any networked device (e.g., the hosts 114a-n). For example, the HA 121 can direct one or more IOs to an array component 101 for further storage processing. In embodiments, the HA 121 can direct an IO request to the array's device interface 123. The device interface 123 can manage the IO request's read/write data operation requiring access to the array's data storage devices 116a-n. For example, the data storage interface 123 can include a device adapter (DA) 130 (e.g., storage device controller), flash drive interface 135, and the like that controls access to the storage devices 116a-n. Likewise, the array's Enginuity Data Services (EDS) processor 110 can manage access to the array's local memory 145. In additional embodiments, the array's EDS 110 can perform one or more self-optimizing techniques (e.g., one or more machine learning techniques) to deliver performance, availability, and data integrity services for the array 105 and its components 101.

In embodiments, the array's storage devices 116a-n can include one or more data storage types, each having distinct performance capabilities. For example, the storage devices 116a-n can include a hard disk drive (HDD), solid-state drive (SSD), and the like. Likewise, the array's local memory 145 can include global memory 150 and memory components 155 (e.g., register memory, shared memory constant memory, user-defined memory, and the like). The array's memory 145 can include primary memory (e.g., memory components 155) and cache memory (e.g., global memory 150). The primary memory and cache memory can be volatile or nonvolatile memory. Unlike nonvolatile memory, volatile memory requires power to store data. Thus, volatile memory loses its stored data if the array 105 loses power for any reason. The primary memory can include dynamic (RAM) and the like in embodiments, while cache memory can comprise static RAM, amongst other similar memory types. Like the array's storage devices 116a-n, the array's memory 145 can have different storage performance capabilities.

In embodiments, a service level agreement (SLA) can define at least one Service Level Objective (SLO) the hosts 114a-n require from the array 105. For example, the hosts 115a-n can include host-operated applications that generate or require data. Moreover, the data can correspond to distinct data categories, and thus, each SLO can specify a service level (SL) for each category. Further, each SL can define a storage performance requirement (e.g., a response time and uptime).

Figure 1A:
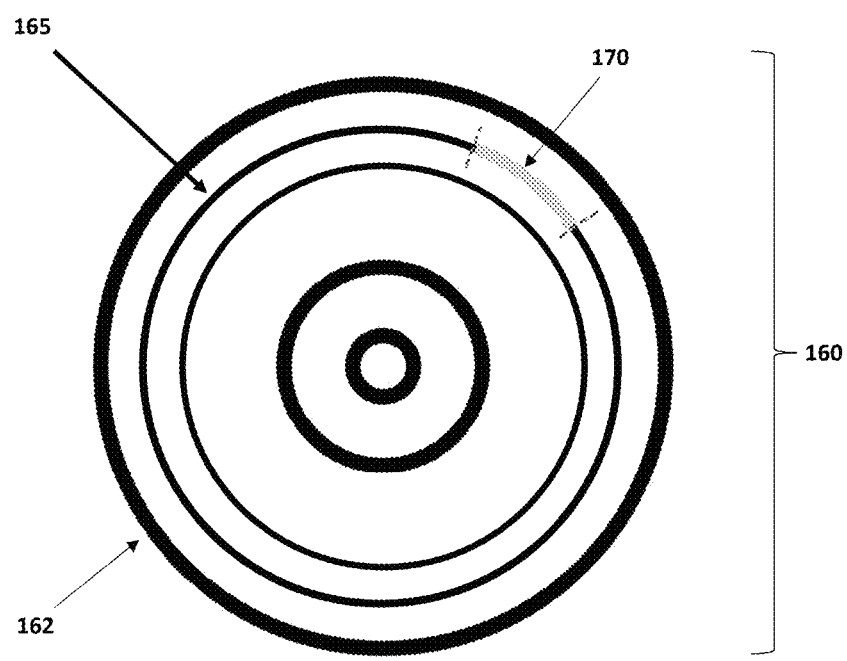
FIG. 1A is a cross-sectional view of a storage device in accordance with embodiments of the present disclosure.

Regarding FIG. 1A, the array 105 can persistently store data on one of its storage devices 116a-n. For example, one of the array's storage devices 116a-n can include an HDD 160 having stacks of cylinders 162. Further, a cylinder 162, like a vinyl record's grooves, can include one or more tracks 165. Thus, the storage array 105 can store data on one or more portions of a disk's tracks 165.

In embodiments, the HA 121 can present the hosts 114a-n with logical representations of slices or portions of the array's physical storage devices 116a-n. For example, a logical unit number (LUN) or virtual storage volume can logically represent a collection of addresses spaces from one or more storage devices 116a-n. Further, a track identifier (TID) can logically represent each address space of a LUN. Moreover, each TID can logically represent a physical storage track unit in example embodiments. Accordingly, the hosts 114a-n can include at least one TID in a metadata field of each IO request sent to the array 105. As such, the HA 121 can direct IO requests by reading the TIDs from each IO request's metadata fields. In addition, the HA 121 can also create a searchable data structure, mapping logical storage representations to their related physical storage address spaces.

In embodiments, the array's EDS 110 can establish a storage/memory hierarchy based on one or more of the SLA and the array's storage/memory performance capabilities. For example, the EDS 110 can establish the hierarchy to include one or more tiers (e.g., subsets of the array's storage/memory) with similar performance capabilities (e.g., response times and uptimes). Thus, the EDS-established fast memory/storage tiers can service host-identified critical and valuable data (e.g., Platinum, Diamond, and Gold SLs), while slow memory/storage tiers service host-identified non-critical and less valuable data (e.g., Silver and Bronze SLs).

The array 105 can further include a dedupe controller 110 configured to perform one or more storage optimization techniques. For example, the controller 110 can perform one or more dedupe techniques based on an analysis of, e.g., historical/current telemetry data and historical/real-time IO workloads. In embodiments, the controller 110 identifies a sequence of input/output (IO) operations in an IO stream received from one or more host devices by a storage array. Additionally, the controller 110 determines whether a set of previously received IO operations match the identified IO sequence. Accordingly, the controller 110 can dedupe the sequences' matching data to reduce redundant data's storage cost and capacity impact. For example, the dedupe controller 110 can perform a data deduplication technique that optimizes the array's storage capacity (e.g., efficiently control utilization of storage resources) as described in greater detail herein.

In addition to residing in array 105, the dedupe controller 110 can reside external to the array 105 or within a component 101. For example, the dedupe controller 110 can exist internal to an Enginuity Data Services (EDS) processor 22 and consume shared resources of the EDS 22, e.g., share the array's processing resources. Additionally, the controller 110 can communicate with the data storage array 105 through several different connections, including, but not limited to, a serial port, a parallel port, and a network interface card via an Ethernet connection. For example, using the Ethernet connection, the dedupe controller 110 can communicate directly with DA 30 and HA 121 within the data storage array 105.

Further, the dedupe controller 110 or any of its elements (e.g., software and hardware elements) can be any one of a variety of commercially available processors, such as an Intel-based processor and the like. In other examples, the dedupe controller 110 can be a parallel processor such as a graphical processing unit (GPU).

Figure 2:
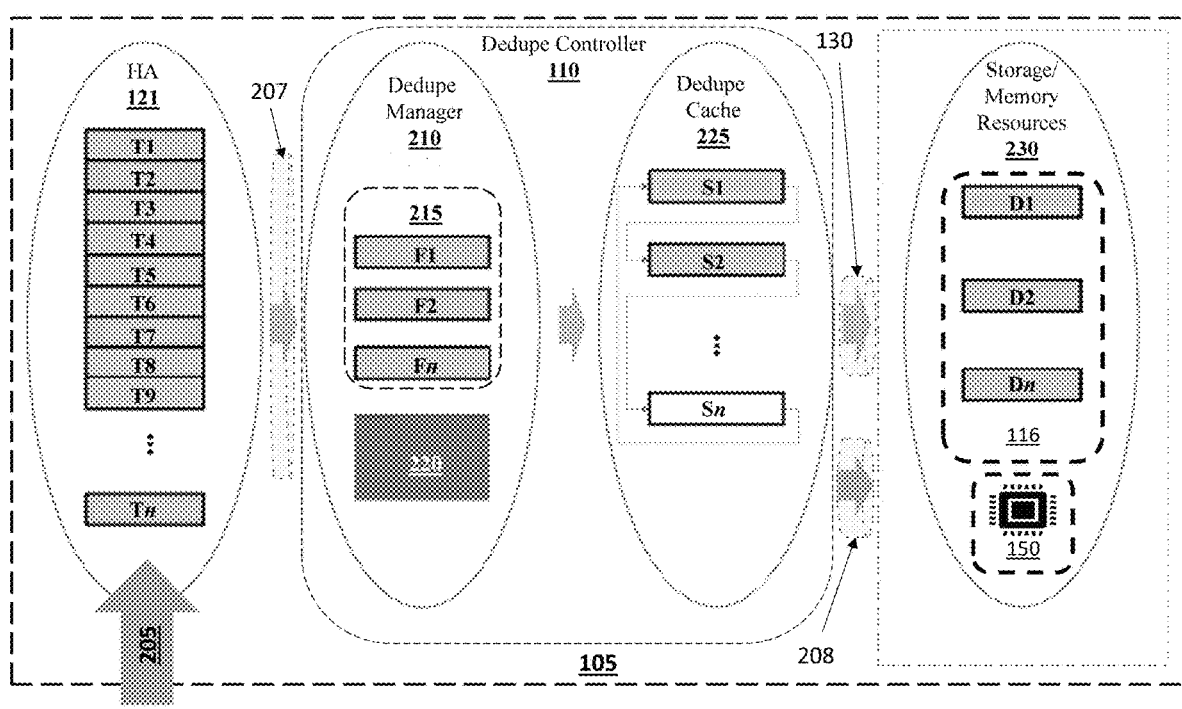
FIG. 2 is a block diagram of a data deduplication (dedupe) data flow in accordance with example embodiments disclosed herein.

Regarding FIG. 2, the dedupe controller 110 can be communicatively coupled to an HA 121, e.g., via a Fibre channel 207. In embodiments, an HA 121 can receive an IO workload 205 from, e.g., the host devices 114*a*-*n* of FIG. 1. Further, the HA 121 can parse each of the workload's IO requests to identify each request's target data tracks T1-*n*. For example, an IO can include a request to read data from or write data to at least one of the tracks T1-*n*. The controller 110 can analyze the IO requests and dedupe redundant data.

In embodiments, the controller 110 can determine each IO request's characteristics by parsing each request's metadata. For example, the controller 110 can parse the metadata to identify a target track's TID and other related IO and storage information. The IO and storage information can define IO characteristics such as a service level (SL), performance expectation (e.g., response time), quality of service (QoS), size, type (e.g., read vs. write), and the like. Additionally, the characteristics can define an IO data payload's format (e.g., raw (uncompressed) or compressed). Moreover, the controller 110 can further determine if previously stored data is in a raw or compressed format. In embodiments, the controller 110 can obtain storage resource metadata (e.g., fingerprints and other storage metadata) from the array's storage resources 230. For example, the controller 110 can obtain metadata from the storage devices 116 via the DA 130. The controller can store the characteristic, metadata, and storage resources information in a local memory 220.

In an embodiment, suppose a first host 114*a* issues an IO requesting the array 105 to store an email and its attachments. Later, a second host 114*b* issues another IO requesting the array 105 to store the same email. The controller 110 can include a dedupe manager 210 that identifies the second host request's data payload as redundant data in such circumstances by comparing a write-IO's payload fingerprint to array-stored data's fingerprints F1-*n* stored in its local memory 220. Further, the manager 210 can dedupe the redundant data based on workload and IO characteristics, data format, data access rates, available array resources, and the like, as described in greater detail below. For example, the manager 210 can search a searchable data structure (e.g., hash-table 215), mapping fingerprints to virtual storage locations (e.g., TIDs) and physical storage locations.

In embodiments, the manager 210 can further reduce read-miss events using a dedupe cache 225. For example, the manager 210 can establish the dedupe cache 225 with one or more cache slots S1-*n*. Furthermore, the manager 210 can further configure the dedupe cache 225 that dynamically ejects data from the least-recently-use (LRU) cache slots S1-*n*. For example, the controller 110 configure the dedupe cache 225 to eject data from the least recently used (LRU) cash slots S1-*n*. Specifically, the manager 210 can cache data corresponding to current/anticipated 'hot' data tracks. For example, a 'hot' data track can correspond to data tracks with access rates above a threshold.

Figure 3:
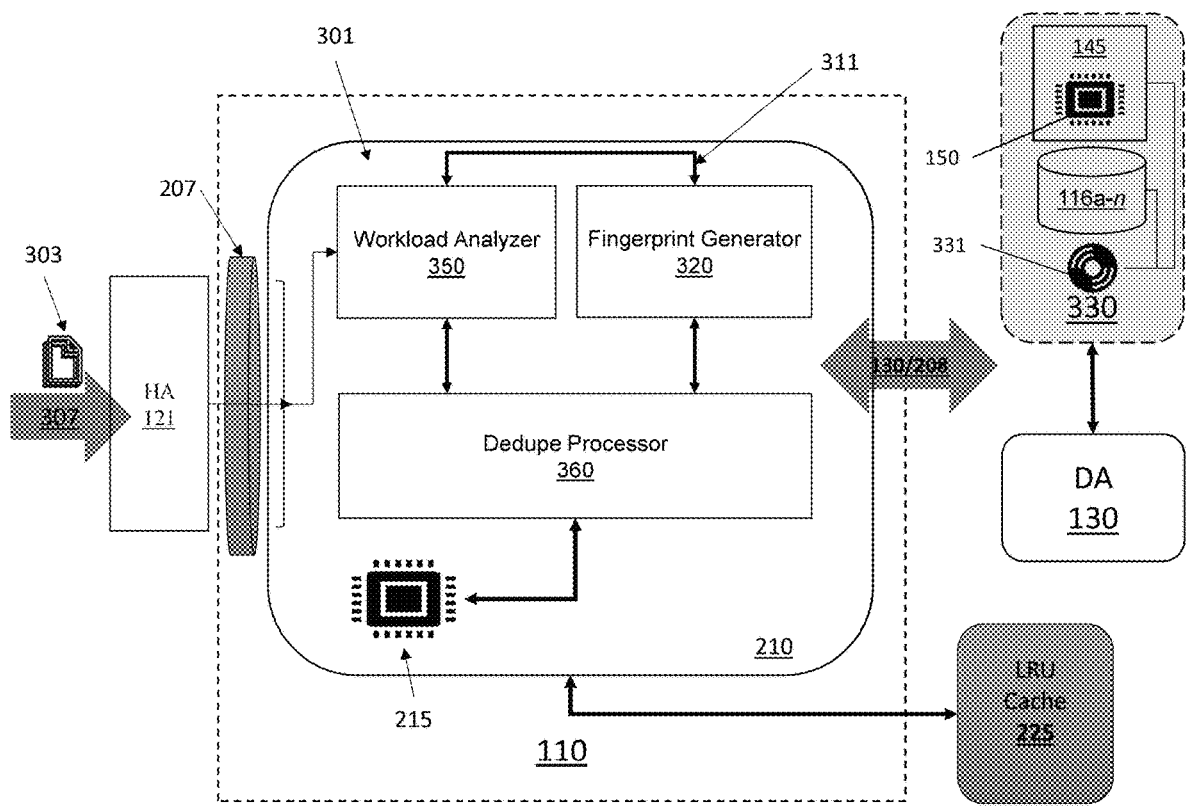
FIG. 3 is a block diagram of a dedupe controller in accordance with embodiments of the present disclosure.

Regarding FIG. 3, the array's HA 121 can receive an IO workload 307 with one or more IOs 303 from host devices (e.g., hosts 114*a*-*n* of FIG. 1). In response to receiving the workload's IOs 303, the dedupe controller 110 can retrieve the IOs 303 via the array's internal communication channels 207 (e.g., a communicative primitive such as Fibre Channels and NVMe (Non-Volatile Memory Express) communication interfaces 207). In embodiments, the controller 110 can include a dedupe manager 210 with logic/circuitry elements 301 that analyze the IOs 303 and perform one or more dedupe operations as described in greater detail below. For example, the dedupe manager 210 and its elements 301 can identify sequential write-IO patterns across multiple storage data tracks. In addition to residing within manager 210, the elements 301 can reside elsewhere, such as in HA 121 or DA 30 of FIG. 1.

In embodiments, the manager 210 can include a fingerprint generator 320 that generates a dedupe fingerprint for the IOs' target data tracks related to each IO. For example, the generator 320 can use one or more of the request's related logical storage identifier (e.g., LUN), physical address space, or data track metadata to generate the fingerprint. Additionally, the generator 320 can store the fingerprints in one or more data structures (e.g., hash tables) 215 that associates fingerprints with their respective data tracks and corresponding physical storage locations. Additionally, the hash data structure 215 can use a flag to link related data tracks. For example, a data track can correspond to a set of sequential write-10*s*. Accordingly, the generator 320 can improve disk storage efficiency by eliminating the need to store multiple references to related tracks.

In embodiments, the fingerprint generator 320 can segment the data involved with a current IO into one or more data portions. Each segmented data portion can correspond to a size of one or more of the data tracks of the devices 116a-n. Therefore, the generator 320 can generate a data segment fingerprint for each segmented data portion. Additionally, the generator 320 can generate data track fingerprints representing the data of each data track identified in the current IO's metadata. For example, each IO can include one or more logical unit numbers (LUNs) representing the data tracks (e.g., TIDs) allocated to provide storage services for the data involved with the IO.

Furthermore, the fingerprints can have a data format optimized (e.g., having characteristics) for search operations. As such, the fingerprint generator 320 can use a hash function to generate a fixed-sized identifier (e.g., fingerprint) from each track's data and a segmented data portion. As a result, the fingerprint generator 320 can restrict searches to fingerprints having a specific length to increase search performances (e.g., speed). Additionally, generator 30 can determine the size of the fingerprints, reducing the probability of distinct data portions having the same fingerprint. Using such fingerprints, the controller 110 can advantageously consume a minimal amount of the array's processing (e.g., CPU) resources to perform a search.

In embodiments, the controller 110 can include a workload analyzer 350. The analyzer 350 can include logic or circuitry configured to analyze the IO workload 307. In addition, the analysis can include identifying one or more characteristics of each IO of the workload 203. For example, each IO can include metadata including information associated with an IO type, data track related to the data involved with each IO, time, performance metrics, and telemetry data, amongst other storage array and IO-related information. Based on historical or current IO characteristic data, the analyzer 350 can identify sequential write-10-sequences and related IO patterns using, e.g., one or more machine learning (ML) techniques. In addition, the analyzer 350 can include logic or circuitry defining a neural network pattern identifier in embodiments. Thus, the analyzer 350 can process historical or current IO requests through its neural network pattern identifier to identify matching write-IO sequences and any corresponding temporal patterns associated with the matching write-IO sequences.

For example, the analyzer 350 can determine that a series or set of write-IO requests correspond to a sequential write-IO request. For example, the analyzer 350 can check a logical block count (LBC) size of each IO request or bulk read each previous track's TID. In a second example, the processor 360 can first identify sequential write-10s (e.g., sequential write extents) by analyzing sequential track allocations, sequential zero reclaim, or sequential read IO prefetches. Second, the analyzer 350 can search cache tracks for recently executed write operations during a time threshold (e.g., over a several millisecond time window). Third, the analyzer 350 can mark bits related to a sequential write-IO pattern's recently executed write operations. For instance, the processor 360 can mark one or more bits of a track's TID to identify an IO's relationship to a sequential write-IO pattern. The processor 360 can establish one of each track's TID as a sequential IO bit and another bit as a sequential IO checked bit.

Accordingly, the analyzer 350 can determine whether the array 105 is experiencing an intensive IO workload using the identified IO patterns. For example, the analyzer 350 can identify the IO workload 203 as intensive if it includes one or more periods during which the array 105 receives a large volume of IOs per second (IOPS).

Further, the analyzer 350 can dynamically monitor the array's storage resources 330, such as the array's storage devices 116a-n and memory resources145, including the global memory 150. The storage resources 330 have storage or memory portions (e.g., slices, sectors, and the like) that can have a related address space identifier (ID). The address space ID defines its related storage resource portion's physical location, e.g., the storage devices 116a-n or global memory 150. The analyzer 350 can monitor the resources 330 by maintaining an activity log of events related to each storage or memory portion.

For example, the array 105 can include daemons 331 that communicatively couple to the array's storage resources 330 via, e.g., a Fibre channel 130/208. The daemons 331 can record their corresponding storage resources' read/write activity in their respective activity logs. Each record can include information defining IO read/write requests associated with each storage or memory portion. The information can include device characteristics such as read/write data type, data size, storage/memory slot size, read/write performance, SL requirement, and telemetry data, amongst other event-related metadata. In addition, the read/write performance can correspond to the array's response time to service each storage or memory portion-related IO read/write request.

The analyzer 350 can generate one or more storage resource snapshots by periodically analyzing each daemon's activity log. In other embodiments, each daemon 331 can randomly or periodically issue activity log reports to the analyzer 350. For example, the analyzer 350 can generate a daemon reporting schedule that defines each daemon's event collection period's duration, start time, or end time. The analyzer 350 can establish the reporting schedules based on patterns of the historical/current workloads, each workload's IO requests, and storage resources' activity levels.

In addition, the analyzer 350 can generate a storage resources heatmap from each storage resources snapshot. Each heatmap can define each storage resource's read/write activity levels for a current IO workload, e.g., IO workload 307. Additionally, the analyzer 350 can identify heatmap patterns using an ML engine (not shown). Further, the analyzer 350 can generate one or more IO request classification policies using the heatmaps and heatmap patterns.

For example, the analyzer 350 can identify the storage resource portions having the highest and lowest relative activity levels during each snapshot's corresponding period. The analyzer 350 can define the highest and lowest relative activity levels using the snapshot's corresponding heatmap. Thus, the analyzer 350 can define each heatmap's activity level range from the storage resource portions having the highest and lowest relative activity levels. The analyzer 350 can further define a storage activity level condition for each heatmap based on each heatmap's activity level range and heatmap patterns' ranges. For example, each storage activity level condition can define a threshold that a request's corresponding storage resource portion's (e.g., address space's) activity level must exceed. The analyzer 350 can generate each IO request classification policy from each heatmap group. For example, a policy classifies a storage resource portion as 'hot' if its activity level exceeds the policy's activity level threshold. If a storage resource portion does not satisfy the policy's activity level condition, it classifies the resource portion as 'cold.'

In embodiments, the manager 210 can also include a dedupe processor 360 that performs one or more data deduplication techniques in response to receiving a write-IO request. Further, the processor 360 can pause data deduplication operations based on a state of the array 105. For example, the processor 360 can perform an array performance check in response to receiving an IO associated with an intensive IO workload. If the array performance check indicates that the array 105 is not meeting at least one performance expectation of one or more hosts (e.g., the hosts 114a-n of FIG. 1), the processor 360 can halt dedupe operations. In other examples, the processor 360 can proceed with performing dedupe operations if an IO is not associated with an intensive workload or the array is meeting performance expectations and can continue to do so should the processor 360 continue to perform dedupe operations.

Further, dedupe processor 360 can compare one or more portions of write data and corresponding one or more portions of data previously stored in the previously allocated data tracks using their respective fingerprints. Current byte to byte (i.e., brute force) dedupe techniques do not consider data access rates or SLAs. Such techniques can consume a significant or unnecessary amount of the array's resources (e.g., disk bandwidth, fabric bandwidth, CPU cycles for comparison, memory, and the like). As such, the array 105 can fail to satisfy a host device's performance requirements (e.g., response times). Accordingly, the processor 360 can limit byte-to-byte dedupe operations to 'hot' data tracks. Further, the processor 360 can cache the hot data in compressed and uncompressed formats in an LRU cache 225.

For example, the processor 360 can include logic/circuitry designed to find trends and seasonality in data access rates using the snapshots and heatmaps generated by the analyzer 350. Using trend and seasonality results, the processor 360 can determine if data track hits are increasing/decreasing during any given snapshot period (e.g., time window). Further, the processor's logic/circuitry can be designed to perform Holt-Winters Exponential Smoothing of the trends and seasonality results to forecast data track access rates. Accordingly, the processor 360 can cache forecasted 'hot' data tracks in the LRU cache 225.

The following text includes details of one or more methods or flow diagrams described by this disclosure. For simplicity of explanation, the methods are depicted and described as one or more acts. In embodiments, the acts can occur in various orders or concurrently with other acts not presented and described herein. Furthermore, not all illustrated acts may be required to implement the methods described by this disclosure.

Figure 4:
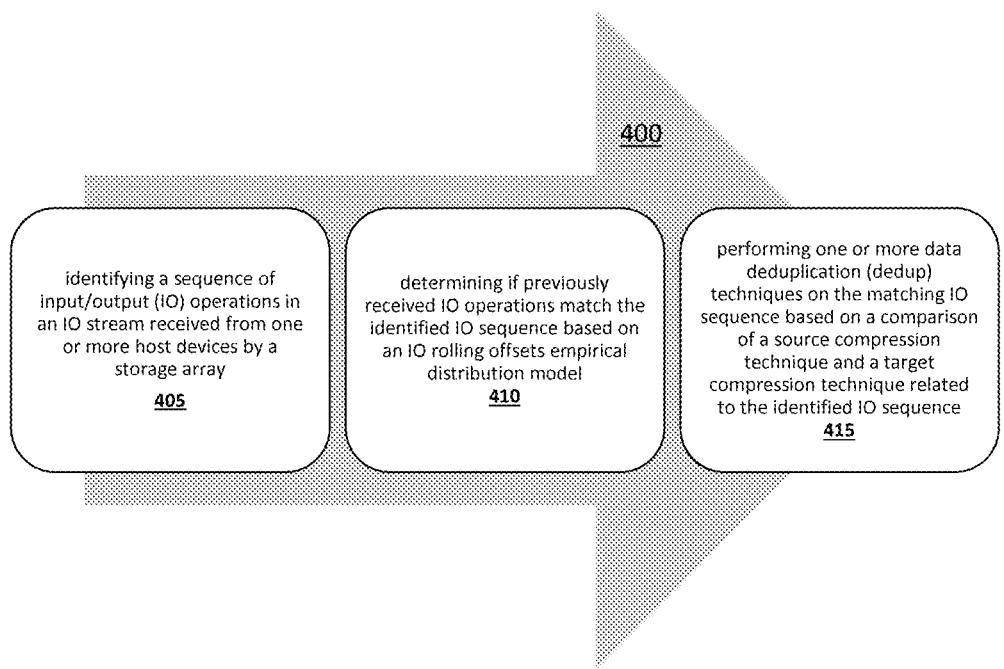
FIG. 4 is a flow diagram of a method for reducing data deduplication latency in accordance with embodiments of the present disclosure.

Regarding FIG. 4, one or more of the array's components (e.g., components 101 of FIG. 1) can execute the method 400. The method 400 describes a byte-to-byte data deduplication technique. At 405, the method 400 can include identifying a sequence of input/output (IO) operations in an IO stream received from one or more host devices by a storage array. The method 400, at 410, can also include determining if previously received IO operations match the identified IO sequence based on an IO rolling offsets empirical distribution model. At 415, the method 400 can further include performing one or more data deduplication (dedup) techniques on the matching IO sequence based on a comparison of a source compression technique and a target compression. It should be noted that each step of the method 400 can include any combination of techniques implemented by the embodiments described herein.

Using the teachings disclosed herein, a skilled artisan can implement the above-described systems and methods in digital electronic circuitry, computer hardware, firmware, or software. The implementation can be as a computer program product. The implementation can, for example, be in a machine-readable storage device for execution by or to control the operation of, data processing apparatus. The implementation can, for example, be a programmable processor, a computer, or multiple computers.

A computer program can be in any programming language, including compiled or interpreted languages. The computer program can have any deployed form, including a stand-alone program, subroutine, element, or other units suitable for a computing environment. One or more computers can execute a deployed computer program.

One or more programmable processors can perform the method steps by executing a computer program to perform the concepts described herein by operating on input data and generating output. An apparatus can also perform the method steps. The apparatus can be a special purpose logic circuitry. For example, the circuitry is an FPGA (field-programmable gate array) or an ASIC (application-specific integrated circuit). Subroutines and software agents can refer to portions of the computer program, the processor, the special circuitry, software, or hardware that implement that functionality.

Processors suitable for the execution of a computer program include, by way of example, both general and special purpose microprocessors and any one or more processors of any digital computer. Generally, a processor receives instructions and data from a read-only memory, a random-access memory, or both. Thus, for example, a computer's essential elements are a processor for executing instructions and one or more memory devices for storing instructions and data. Generally, a computer can include, can be operatively coupled to receive data from or transfer data to one or more mass storage devices for storing data (e.g., magnetic, magneto-optical disks, or optical disks).

Data transmission and instructions can also occur over a communications network. Information carriers that embody computer program instructions and data include all nonvolatile memory forms, including semiconductor memory devices. The information carriers can, for example, be EPROM, EEPROM, flash memory devices, magnetic disks, internal hard disks, removable disks, magneto-optical disks, CD-ROM, or DVD-ROM disks. In addition, the processor and the memory can be supplemented by or incorporated in special purpose logic circuitry.

A computer having a display device that enables user interaction can implement the above-described techniques such as a display, keyboard, mouse, or any other input/output peripheral. The display device can, for example, be a cathode ray tube (CRT) or a liquid crystal display (LCD) monitor. The user can provide input to the computer (e.g., interact with a user interface element). In addition, other kinds of devices can provide for interaction with a user. Other devices can, for example, be feedback provided to the user in any form of sensory feedback (e.g., visual feedback, auditory feedback, or tactile feedback). Input from the user can, for example, be in any form, including acoustic, speech, or tactile input.

A distributed computing system with a back-end component can also implement the above-described techniques. The back-end component can, for example, be a data server, a middleware component, or an application server. Further, a distributing computing system with a front-end component can implement the above-described techniques. The front-end component can, for example, be a client computer having a graphical user interface, a Web browser through which a user can interact with an example implementation, or other graphical user interfaces for a transmitting device. Finally, the system's components can interconnect using any form or medium of digital data communication (e.g., a communication network). Examples of communication networks include a local area network (LAN), a wide area network (WAN), the Internet, wired networks, or wireless networks.

The system can include clients and servers. A client and a remote server can interact through a communication network. A client and server relationship can arise by computer programs running on the respective computers and having a client-server relationship.

Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), 802.11 networks, 802.16 networks, general packet radio service (GPRS) network, HiperLAN), or other packet-based networks. Circuit-based networks can include, for example, a public switched telephone network (PSTN), a private branch exchange (PBX), a wireless network, or other circuit-based networks. Finally, wireless networks can include RAN, Bluetooth, code-division multiple access (CDMA) network, time division multiple access (TDMA) network, and global system for mobile communications (GSM) network.

The transmitting device can include, for example, a computer, a computer with a browser device, a telephone, an IP phone, a mobile device (e.g., cellular phone, personal digital assistant (P.D.A.) device, laptop computer, electronic mail device), or other communication devices. The browser device includes, for example, a computer (e.g., desktop computer, laptop computer) with a world wide web browser (e.g., Microsoft® Internet Explorer® and Mozilla®). The mobile computing device includes, for example, a Blackberry®.

Comprise, include, or plural forms of each are open-ended, include the listed parts, and contain additional unlisted elements. Unless explicitly disclaimed, the terms terms 'or,' and' are open-ended and include one or more of the listed parts, items, or elements and combinations thereof.

What is claimed is:

1. A method comprising:
   identifying a sequence of input/output (IO) operations in an IO stream received from one or more host devices by a storage array;
   determining if previously received IO operations match the identified IO sequence based on an IO rolling offsets empirical distribution model that identifies track offsets across multiple tracks corresponding to each IO; and
   performing one or more data deduplication (dedup) techniques on the matching IO sequence based on a comparison of a source compression technique and a target compression technique related to the identified IO sequence.

2. The method of claim 1 further comprising:
   generating a unique fingerprint of the IO sequence in response to a first event identifying the IO sequence, wherein generating the unique fingerprint includes:
   identifying a data track related to each IO operation of the IO stream, the data track corresponding to one of the storage system's storage devices; and
   updating a searchable fingerprint data structure configured to map each unique fingerprint to its related data track address.

3. The method of claim 1 further comprising:
   generating a temporal parameter corresponding to each IO operation of the identified IO sequence; and
   updating a searchable fingerprint data structure to associate each fingerprint with the temporal parameter of the fingerprint's related IO operations.

4. The method of claim 1 further comprising:
   determining whether the identified IO sequence includes or relates to compressed data.

5. The method of claim 4 further comprising:
   determining whether the source compression technique related to the IO sequence's data payload matches the target compression technique related to the IO sequence's target data stored by the array.

6. The method of claim 5 further comprising:
   selecting a data compression technique for uncompressed data based on the uncompressed data's related data access rates.

7. The method of claim 1 further comprising:
   determining a data access rate of one or more data tracks;
   comparing the data access rates of each data track to a threshold; and
   storing compressed or uncompressed versions of the data related to the data tracks based on a result of the comparison in a cache.

8. The method of claim 7 further comprising
   analyzing historical and current events related to the data access rates of each data track; and
   identifying one or more data access rate patterns based on the analysis.

9. The method of claim 8 further comprising:
   analyzing a time-series relationship of the historical and current events related to the data access rates of each data track per time window.

10. The method of claim 1 further comprising:
    storing data in a cache, wherein the data stored in the cache relates to data tracks having a data access rate above a threshold; and
    performing one or more data deduplication (dedupe) operations for the matching IO sequence based on the comparison of the source and target compression techniques and the data access rates.

11. An apparatus including a processor and memory configured to:
    identify a sequence of input/output (IO) operations in an IO stream received from one or more host devices by a storage array;
    determine if previously received IO operations match the identified IO sequence based on an IO rolling offsets empirical distribution model that identifies track offsets across multiple tracks corresponding to each IO; and
    perform one or more data deduplication (dedup) techniques on the matching IO sequence based on a comparison of a source compression technique and a target compression technique related to the identified IO sequence.

12. The apparatus of claim 11 further configured to:
    generate a unique fingerprint of the IO sequence in response to a first event identifying the IO sequence, wherein generating the unique fingerprint includes:

identify a data track related to each IO operation of the IO stream, the data track corresponding to one of the storage system's storage devices; and update a searchable fingerprint data structure configured to map each unique fingerprint to its related data track address.

13. The apparatus of claim 11 further configured to:

generate a temporal parameter corresponding to each IO operation of the identified IO sequence; and update a searchable fingerprint data structure to associate each fingerprint with the temporal parameter of the fingerprint's related IO operations.

14. The apparatus of claim 11 further configured to:

determine whether the identified IO sequence includes or relates to compressed data.

15. The apparatus of claim 14 further configured to:

determine whether the source compression technique related to the IO sequence's data payload matches the target compression technique related to the IO sequence's target data stored by the array.

16. The apparatus of claim 15 further configured to:

select a data compression technique for uncompressed data based on the uncompressed data's related data access rates.

17. The apparatus of claim 11 further configured to:

determine a data access rate of one or more data tracks;

compare the data access rates of each data track to a threshold; and store compressed or uncompressed versions of the data related to the data tracks based on a result of the comparison in a cache.

18. The apparatus of claim 17 further configured to analyze historical and current events related to the data access rates of each data track; and identify one or more data access rate patterns based on the analysis.

19. The apparatus of claim 18 further configured to:

analyze a time-series relationship of the historical and current events related to the data access rates of each data track per time window.

20. The apparatus of claim 11 further configured to:

store data in a cache, wherein the data stored in the cache relates to data tracks having a data access rate above a threshold; and perform one or more data deduplication (dedupe) operations for the matching IO sequence based on the comparison of the source and target compression techniques and the data access rates.

\* \* \* \* \*